US012786258B2

(12) United States Patent
Strein et al.

(10) Patent No.: US 12,786,258 B2
(45) Date of Patent: Nov. 3, 2026

(54) SEAMLESS VIDEO SWITCHING BY COMMERCIAL OFF-THE-SHELF (COTS) DEVICES

(71) Applicant: Disney Enterprises, Inc., Burbank, CA (US)

(72) Inventors: Michael J. Strein, Bohemia, NY (US); David E. Potter, Altadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/947,598

(22) Filed: Sep. 19, 2022

(65) Prior Publication Data

US 2024/0098128 A1 Mar. 21, 2024

(51) Int. Cl.
*H04L 65/65* (2022.01)
*H04L 65/75* (2022.01)
*H04L 69/22* (2022.01)

(52) U.S. Cl.
CPC ............ *H04L 65/65* (2022.05); *H04L 65/764* (2022.05); *H04L 69/22* (2013.01)

(58) Field of Classification Search
CPC ........ H04L 65/65; H04L 65/764; H04L 69/22
See application file for complete search history.

(56) References Cited

U.S. PATENT DOCUMENTS 10,038,651 B2 * 7/2018 Rayner .................... H04L 49/35
10,848,800 B2 * 11/2020 Tsukagoshi ........ H04N 21/4345
10,855,730 B2 * 12/2020 Sabet .................. H04L 65/1069
2005/0120038 A1 * 6/2005 Jebb .................... H04N 21/2402
707/999.102
2005/0172028 A1 * 8/2005 Nilsson .................... H04L 65/70
375/E7.014
2010/0115630 A1 * 5/2010 Maire ................. H04L 63/0227
370/352
2011/0069173 A1 * 3/2011 Hazzani ................ H04W 4/029
348/E7.085
2011/0268178 A1 * 11/2011 Park ..................... H04N 21/238
375/240.02

(Continued)

OTHER PUBLICATIONS

SMPTE Recommended Practice, Definition of Vertical Interval Switching Point for Synchronous Video Switching, Approved Jul. 17, 2009, RP 168-2009 Revision of RP 168-2002 (Year: 2009).*

(Continued)

*Primary Examiner* — Abdelbasst Talioua
(74) *Attorney, Agent, or Firm* — Farjami & Farjami LLP

(57) ABSTRACT

A switch includes processing hardware and a memory storing software code. The software code is executed to begin receiving a first video stream from a first media source, begin forwarding the first video stream to a video receiver, begin receiving a second video stream from a second media source, receive a switch command to forward the second video stream to the video receiver instead of the first video stream, and detect, within a frame of the first video stream, a switch point in a video packet header of a video packet contained within that frame. The software code begins forwarding, in response to the switch command and at the switch point, the second video stream to the video receiver, and contemporaneously stops forwarding the first video stream to the video receiver, to provide seamless switching from the first video stream to the second video stream.

18 Claims, 5 Drawing Sheets

(56) References Cited

U.S. PATENT DOCUMENTS

| | | | | |
|---|---|---|---|---|
| 2012/0047405 | A1* | 2/2012 | Smaak | H04L 12/1868 714/48 |
| 2012/0331167 | A1* | 12/2012 | Hunt | H04N 21/8355 709/231 |
| 2014/0184909 | A1* | 7/2014 | Laabs | H04N 21/42204 348/554 |
| 2016/0164835 | A1* | 6/2016 | Hoffmann | H04L 63/0272 726/1 |
| 2018/0069908 | A1* | 3/2018 | Buchanan | H04L 12/18 |
| 2018/0070126 | A1* | 3/2018 | Martel | H04L 65/80 |
| 2018/0359499 | A1* | 12/2018 | Mavlankar | H04N 21/4384 |
| 2018/0367586 | A1* | 12/2018 | Maze | H04N 21/6437 |
| 2019/0132366 | A1* | 5/2019 | Sabet | H04L 65/1069 |
| 2019/0371351 | A1* | 12/2019 | Neuendorf | G10L 19/167 |
| 2020/0021821 | A1* | 1/2020 | Hawari | H04L 65/80 |
| 2020/0036760 | A1* | 1/2020 | Lavoie | H04L 65/1066 |
| 2021/0176408 | A1* | 6/2021 | Zhang | H04N 21/64322 |
| 2021/0204007 | A1* | 7/2021 | Xiong | H04N 21/234 |
| 2021/0359923 | A1* | 11/2021 | Koyama | H04L 43/0888 |

OTHER PUBLICATIONS

SMPTE RP 168-2009 (SMPTE Recommended Practice: Definition of Vertical Interval Switching Point for Synchronous Video Switching; Approved Jul. 17, 2009) (Year: 2009).*

Wes Simpson "SMPTE ST 2110 in 60 Minutes" IP Showcase Theatre at NAB Apr. 8-11, 2019 39 Pgs.

"Professional Media Over Managed IP Networks: Uncompressed Active Video" The Society of Motion Picture and Television Engineers Sep. 18, 2017 22 pgs.

* cited by examiner

SEAMLESS VIDEO SWITCHING BY COMMERCIAL OFF-THE-SHELF (COTS) DEVICES

BACKGROUND

Video distribution environments have typically required clean switching, i.e., the ability to switch from one video source to another without tearing or breakup in the video. Clean switching has been accomplished historically in dedicated video signals having specific formats, from analog Black and White, through analog color and digital formats, up to the current migration to Internet streaming formats, using corresponding dedicated hardware switches.

More recent conventional solutions for achieving clean switching in the Internet Protocol (IP) realm typically require the video receiver to accept two video sources concurrently and to determine the appropriate time for the switch. One major disadvantage of this approach is that double the bandwidth is required in the routing matrix because both video sources must be sent to the receiver for a period of time. Another approach involves sending a proprietary timing signal to the IP switch that matches the frame rate of the source signals being used. Although this approach avoids the double bandwidth problem described above, it has several drawbacks, including the requirement for proprietary hardware configured to receive the proprietary timing signal, the assumption that all video sources use the same video timing format, and the requirement that any sources from external systems delivered with significant latency be re-timed to the same timing source that the switch receives.

Thus, there is a need in the art for a switching solution enabling clean video switching using standard, commercial off-the-shelf (COTS) IP switching devices.

DETAILED DESCRIPTION

Figure 1:
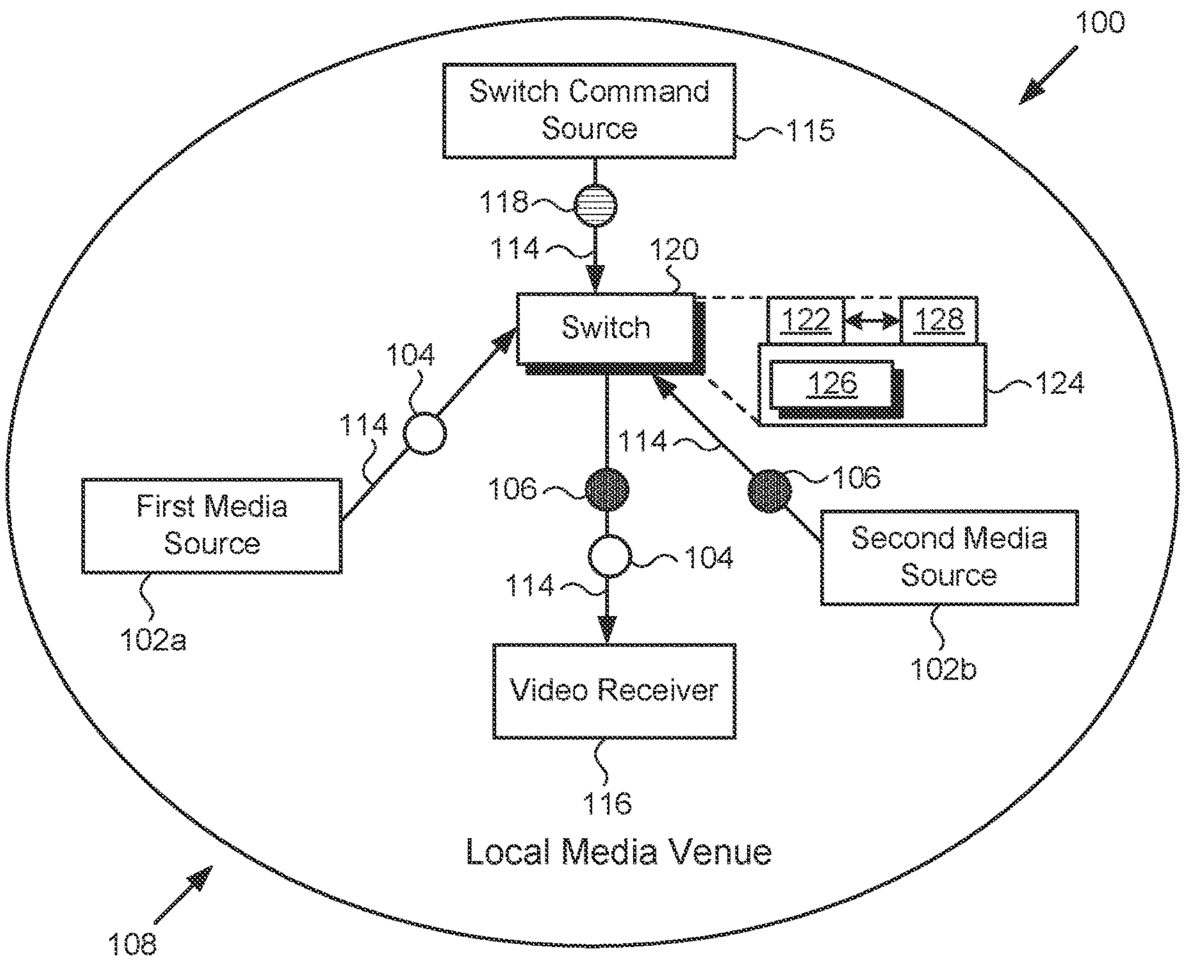
FIG. 1 shows a diagram of an exemplary video distribution environment including a switch configured to provide seamless video switching, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, video distribution environments have typically required clean switching, i.e., the ability to switch from one video source to another without tearing or breakup in the video. As further noted above, clean switching has been accomplished historically in dedicated video signals having specific formats, from analog Black and White, through analog color and digital formats, up to the current migration to Internet streaming formats, using corresponding dedicated hardware switches.

The present application discloses systems and methods for providing clean video switching (hereinafter also referred to as "seamless video switching") for video over Internet Protocol (IP). It is noted that the seamless video switching solution disclosed by the present application addresses seamless video switching in the IP domain, but does not guarantee clean audio switching. It is noted that there are existing methods describing clean audio switching that include buffering of the audio packets and a gentle cross fade between audio sources to minimize any distortion. As those methods are known in the art, they are not described here. Nevertheless, in various implementations, the seamless video switching solution disclosed by the present application may incorporate those known methods for clean audio switching.

One significant advantage of the present switching solution is that it enables seamless video switching using readily available commercial off-the-shelf (COTS) switching devices (hereinafter "COTS devices"). It is noted that, as defined in the present application, the feature "video" may refer to video content without audio or to video content accompanied by or including audio. Moreover, it is further noted that the switching solution disclosed in the present application may advantageously be implemented as automated systems and methods.

As used in the present application, the terms "automation." "automated." and "automating" refer to systems and processes that do not require the participation of a human administrator. Although in some implementations the performance of the switches and switching methods disclosed herein may be reviewed or even modified by a human system or device administrator, that human involvement is optional. Thus, the methods described in the present application may be performed under the control of hardware processing components of the disclosed systems.

By way of overview, clean switching of video signals can occur when the transition point happens in the Vertical Blanking Interval, i.e., a period of the video frame in which lines are reserved for vertical retrace on displays. This switching strategy is standard for substantially all video formats, including progressive and interlace formats, regardless of line count and frame rate. IP encapsulated video signals have their line counts referenced and their location defined in IP standards such as Society of Motion Picture and Television Engineers (SMPTE) 2110, the standard for professional media over managed IP networks. It is noted that the details of this IP standard are described in SMPTE ST 2110-20:2017 document, titled "Professional Media Over Managed IP Networks: Uncompressed Active Video Standard by Society of Motion Picture and Television Engineers." dated Sep. 18, 2017, which is hereby incorporated fully by reference into the present application.

It is further noted that many COTS IP switches on the market today often include a software layer that can be programmed like any hardware processor enabled computing device. According to the novel and inventive seamless video switching solution disclosed by the present application this programmable logic allows the COTS IP switch to be configured to inspect the contents of a video packet, to make forwarding decisions based on those contents, and even to alter the video packet data in real-time.

For example, and as disclosed herein in some use cases, when such a programmed IP switch identifies the appropriate markers in a video stream for triggering switching from one video source to another, the switch may stop forwarding packets from the original source, and begin forwarding packets from the new source. It is noted that this approach will require the video receiver to begin listening for packets from the new source synchronously with the switch.

As an alternative example, and as also disclosed herein, in some use cases the programmed IP switch may stop forwarding packets from the original source, and begin forwarding packets from the new source, and may perform Network Address Translation (NAT) by altering the forwarded packets so that they retain the same stream identifiers the receiver was already receiving from the original source, e.g., typically multicast group number and User Datagram Protocol (UDP).

Thus, the seamless video switching solution described herein discloses actions that can be programmed into a COTS IP switch to detect a switch point in a video packet header of a video packet contained in a frame, and to seamlessly switch from one media source to another in response to a switch command at the switch point. It is noted that the present approach assumes that the two media sources between which switching is performed are time synchronized with one another, which is usually the case for affiliated sources controlled by the same media entity. It is further noted that the present switching solution may advantageously be utilized for all video line and frame rates.

FIG. 1 shows a diagram of exemplary video distribution environment 100 including switch 120 configured to provide seamless video switching, according to one implementation. According to the exemplary implementation shown in FIG. 1, switch 120, which may be a COTS IP switch for example, is situated in local media venue 108, such as a media production or broadcast facility for example. As shown in FIG. 1, switch 120 includes processing hardware 122, transceiver 128, and memory 124 implemented as a computer-readable non-transitory storage medium storing seamless switching software code 126. As further shown in FIG. 1, switch 120 is communicatively coupled to first media source 102*a*, second media source 102*b*, switch command source 115, and video receiver 116, all of which are also shown to be situated in local media venue 108, by wired or wireless local communication links 114. Also shown in FIG. 1 are first video stream 104 provided by first media source 102*a*, second video stream 106 provided by second media source 102*b*, and switch command 118 provided by switch command source 115.

It is noted that, in various use cases, first video stream 104 and second video stream 106 may carry the same, or different, content. By way merely example, in some use cases, first video stream 104 may carry pre-recorded programming content, while second video stream 106 may carry a live feed, or vice versa. Alternatively, video streams 104 and 106 may carry the same content, but maintenance requirements or resource reallocation may make it advantageous or desirable to switch from first media source 102*a* to second media source 102*b* as the source of that same content. Moreover, in various implementations, first and second video streams 104 and 106 may carry any type of broadcast or transmission over IP signals.

It is noted that although FIG. 1 depicts first media source 102*a*, second media source 102*b*, switch command source 115, and video receiver 116 as being situated within local media venue 108 that representation is merely by way of example. In other implementations, first media source 102*a* may be situated within local media venue 108 and second media source 102*b* may be remote from local media venue 108, or vice versa. Moreover, in various other implementations, one or both of switch command source 115 or video receiver 116 may not be situated within local media venue 108 but may be remote from local media venue 108, where local venue includes switch 120 and one or both of first media source 102*a* and second media source 102*b*.

With respect to memory 124 of switch 120, it is further noted that memory 124 may take the form of any computer-readable non-transitory storage medium. The expression "computer-readable non-transitory storage medium." as defined in the present application, refers to any medium, excluding a carrier wave or other transitory signal that provides instructions to processing hardware 122 of switch 120. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Processing hardware 122 may include one or more hardware processing units, such as one or more central processing units, for example. By way of definition, as used in the present application, the expression "central processing unit" (CPU) has its customary meaning in the art. That is to say, a CPU includes an Arithmetic Logic Unit (ALU) for carrying out the arithmetic and logical operations of switch 120, as well as a Control Unit (CU) for retrieving programs, such as seamless switching software code 126, from memory 124. Alternatively, or in addition, processing hardware 122 may include an application-specific integrated circuit (ASIC) configured specifically to execute the seamless switching method disclosed in greater detail below by reference to FIG. 5.

Transceiver 128 of switch 120 may be implemented as any suitable wireless communication unit. For example, transceiver 128 may be implemented as a fourth generation (4G) wireless transceiver, or as a 5G wireless transceiver. In addition, or alternatively, transceiver 128 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

In various implementations, one or both of first media source 102*a* and second media source 102*b* may be a resource of a media production or broadcast facility. Furthermore it is noted that first video stream 104 provided by first media source 102*a* and second video stream 106 provided by second media source 102*b* may include video in a variety of formats including high-definition HD 720p or 1080p video, Quad HD 2K video, or ultra HD (UHD) 4K or 8K video in either of progressive format or interlaced format.

It is also noted that, that the content carried by first video stream 104 and second video stream 106 may include content of widely varying types. Examples of the types of content carried by first video stream 104 and second video stream 106 may include audio-video content having both audio and video components, or video unaccompanied by audio, as noted above. In addition, or alternatively, in some implementations, the type of content carried by first video stream 104 and second video stream 106 may be or include digital representations of persons, fictional characters, locations, objects, and identifiers such as brands and logos, for example, which populate a virtual reality (VR), augmented reality (AR), or mixed reality (MR) environment. Such content may depict virtual worlds that can be experienced by any number of users synchronously and persistently, while providing continuity of data such as personal identity, user history, entitlements, possessions, payments, and the like. In some implementations, the content carried by first video stream 104 and second video stream 106 may be a hybrid of traditional audio-video and fully immersive VR/AR/MR experiences, such as interactive video.

Figure 2:
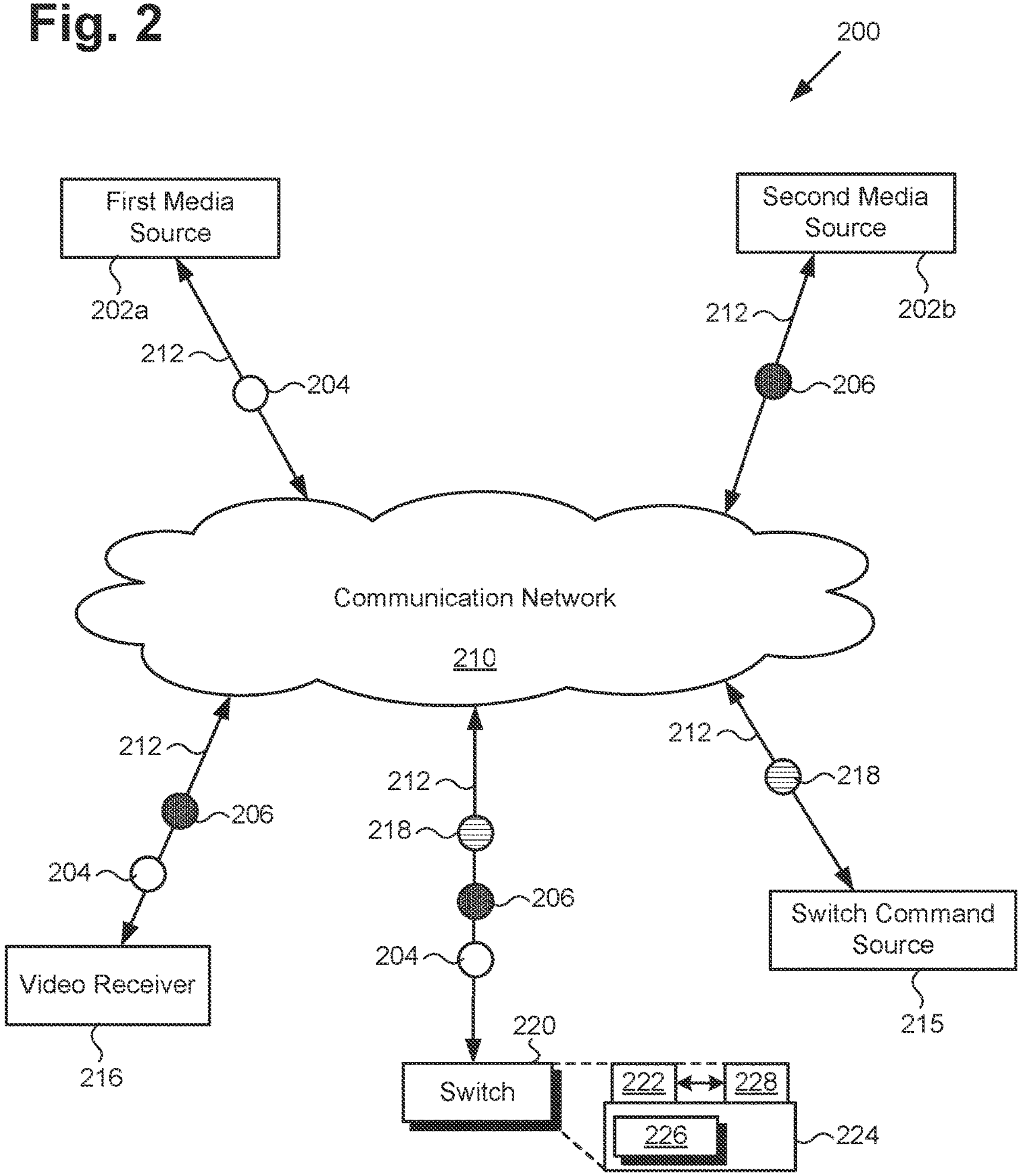
FIG. 2 shows a diagram of an exemplary video distribution environment including a switch configured to provide seamless video switching, according to another implementation.

FIG. 2 shows a diagram of exemplary video distribution environment 200 including switch 220 configured to provide seamless video switching, according to another implementation. According to the exemplary implementation shown in FIG. 2, switch 220, first media source 202*a*, second media source 202*b*, switch command source 215, and video receiver 216 are all remotely located from one another. As shown in FIG. 2, switch 220 includes processing hardware 222, transceiver 228, and memory 224 implemented as a computer-readable non-transitory storage medium storing seamless switching software code 226. As further shown in FIG. 2, switch 220, first media source 202*a*, second media source 202*b*, switch command source 215, and video receiver 216 are communicatively coupled to one another by communication network 210 and network communication links 212. Also shown in FIG. 2 are first video stream 204 provided by first media source 202*a*, second video stream 206 provided by second media source 202*b*, and switch command 218 provided by switch command source 215.

Switch 220 including processing hardware 222, transceiver 228, memory 224, and seamless switching software code 226 corresponds in general to switch 120 including processing hardware 122, transceiver 128, memory 124, and seamless switching software code 126, in FIG. 1. That is to say, switch 220, processing hardware 222, transceiver 228, memory 224, and seamless switching software code 226 may share any of the characteristics attributed to respective switch 120, processing hardware 122, transceiver 128, memory 124, and seamless switching software code 126 by the present disclosure, and vice versa. Thus, like switch 120, switch 220 may take the form of a COTS IP switch.

In addition, first media source 202*a*, first video stream 204, second media source 202*b*, second video stream 206, switch command source 215, switch command 218, and video receiver 216, in FIG. 2, correspond respectively in general to first media source 102*a*, first video stream 104, second media source 102*b*, second video stream 106, switch command source 115, switch command 118, and video receiver 116, in FIG. 1. Consequently, first media source 202*a*, first video stream 204, second media source 202*b*, second video stream 206, switch command source 215, switch command 218, and video receiver 216 may share any of the characteristics attributed to respective first media source 102*a*, first video stream 104, second media source 102*b*, second video stream 106, switch command source 115, switch command 118, and video receiver 116 by the present disclosure, and vice versa.

In some implementations, one or more of first media source 202*a*, second media source 202*b*, switch command source 215, or video receiver 216 may correspond to one or more web servers accessible over communication network 210 in the form of a packet-switched network such as the Internet, for example. Alternatively, communication network 210 may be implemented as a wide area network (WAN), a local area network (LAN), or another type of private or limited distribution network. Furthermore, in some implementations, one or more of first media source 202*a*, second media source 202*b*, switch command source 215, or video receiver 216 may be implemented virtually, such as in a data center. For example, in some implementations, one or more of first media source 202*a*, second media source 202*b*, switch command source 215, or video receiver 216 may be implemented in software, or as a virtual machine.

In various implementations, one or both of first media source 202*a* and second media source 202*b* may be a resource of a media production or broadcast facility, a node of a content delivery network CDN, or a source of a remote live feed, to name a few examples. Video distribution environment 200, in FIG. 2, differs from video distribution environment 100, in FIG. 1, in that according to the exemplary implementation shown in FIG. 2, switch 220 is remote from each of first media source 202*a*, second media source 202*b*, switch command source 215, and video receiver 216. As a result, switch 220 receives each of first video stream 204, second video stream 206, and switch command 218 via communication network 210 and network communication links 212, and forwards each of first video stream 204 and second video stream 206 to video receiver 216 via communication network 210 and network communication links 212.

Figure 3:
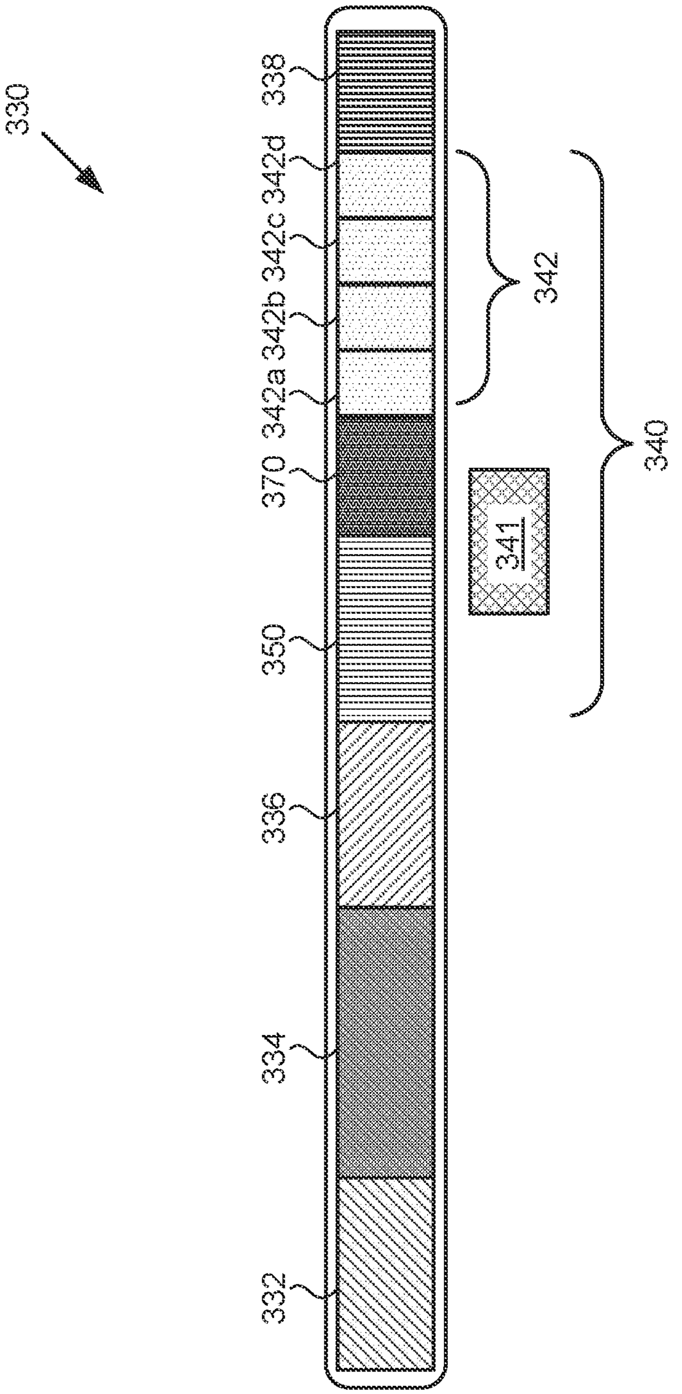
FIG. 3 shows a diagram of an exemplary frame of video that includes a switch point in a video packet header of a video packet contained within the frame, according to one implementation.

FIG. 3 shows a diagram of exemplary frame 330 of video that includes switch point 341 for switching from a video stream including frame 330 to another video stream. According to one implementation, switch point 341 may be in a video packet header of video packet 340 contained within frame 330. Referring to FIG. 3 in combination with FIGS. 1 and 2, it is noted that frame 330, which may take the form of an Ethernet frame for example, may be a frame of video carried by first video stream 104/204 and second video stream 106/206.

According to the exemplary implementation shown in FIG. 3, frame 330 may include Media Access Control (MAC) packet header 332, IP packet header 334. User Datagram Protocol (UDP) packet 336, video packet 340, and check sequence 338. As further shown in FIG. 3, video packet 340 contains video packet header 350, video packet payload header 370, and payload 342 including exemplary pixel groups or "pgroups" 342*a*, 342*b*, 342*c*, and 342*d* (hereinafter "pgroups 342*a*-342*d*"). It is noted that although the exemplary implementation shown in FIG. 3 depicts payload 340 of frame 330 as containing four pgroups 342*a*-342*d*, that representation is provided merely in the interests of conceptual clarity. In many implementations, a video packet corresponding to video packet 340 may include a payload having more than, or fewer than, four pgroups. It is further noted that, according to the seamless switching solution disclosed in the present application, switch point 341 is situated in one of video packet header 350 or video packet payload header 370 of video packet 340.

Figure 4:
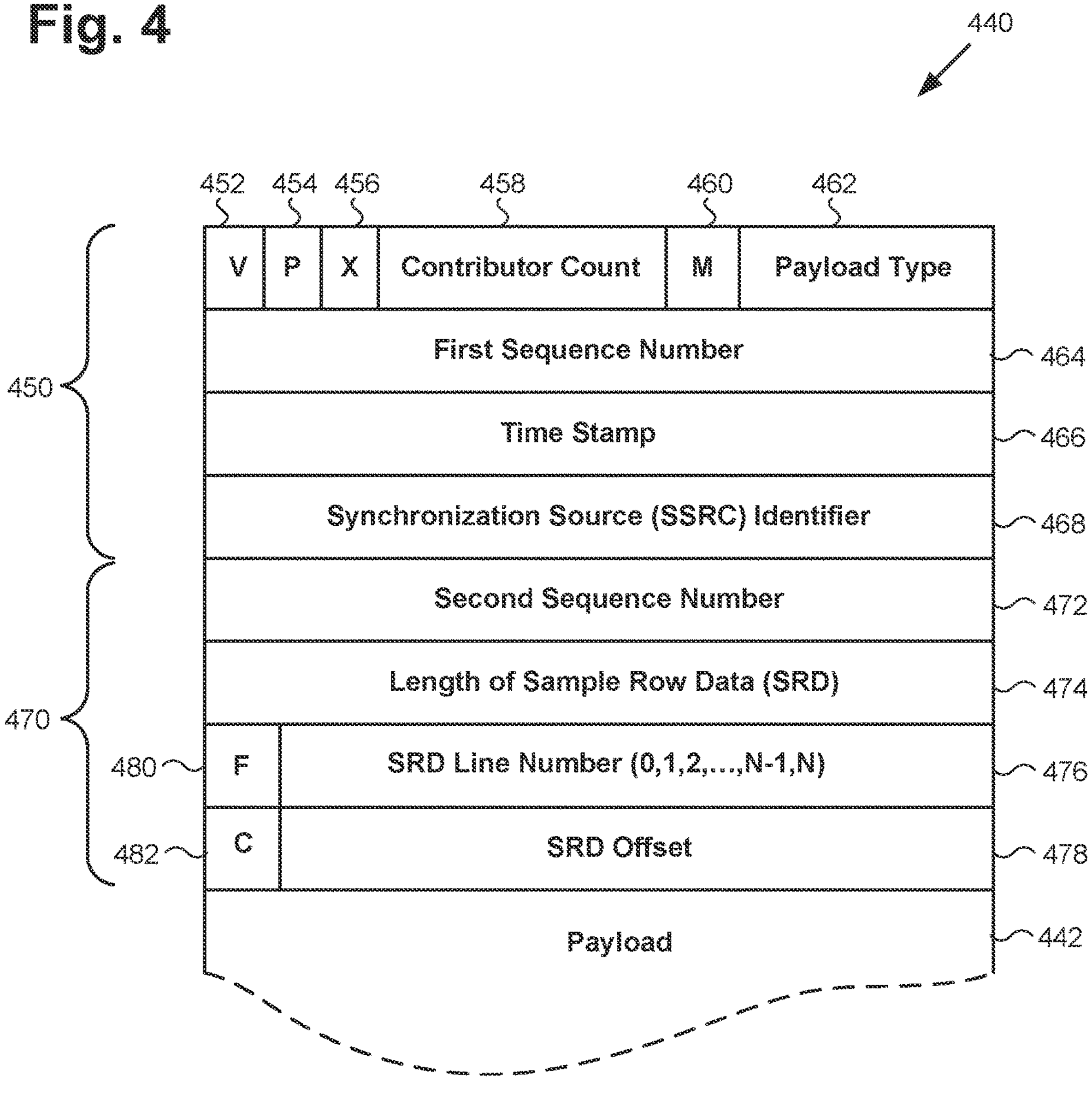
FIG. 4 shows a more detailed diagram of exemplary video packet headers contained within the frame shown in FIG. 3, according to one implementation.

FIG. 4 shows a more detailed diagram of an exemplary video packet header and video packet payload header contained within frame 330 shown in FIG. 3, according to one implementation. FIG. 4 shows a portion of video packet 440, shown as an exemplary Real-Time Transfer Protocol (RTP) packet, including video packet header 450, video packet payload header 470, and payload 442. It is noted that video packet 440 including video packet header 450, video packet payload header 470, and payload 442 corresponds in general to video packet 340 of FIG. 3, which includes video packet header 350, video packet payload header 370, and payload 342. Consequently, video packet 340, video packet header 350, video packet payload header 370, and payload 342 may share any of the characteristics attributed to respective video packet 440, video packet header 450, video packet payload header 470, and payload 442 by the present disclosure, and vice versa.

According to the exemplary implementation shown in FIG. 4, video packet header 450 may be an RTP header including version number "V" 452, padding bit "P" 454, extension bit "X" 456, contributor count data 458, RTP marker bit "M" 460, payload type data 462 identifying the type of data carried by payload 442, first sequence number 464 identifying the 16 low order bits of the extended 32-bit RTP packet sequence counter of exemplary video packet 440, time stamp 466, and synchronization source (SSRC) identifier 468 identifying the source of video packet 440. As further shown in FIG. 4, video packet payload header 470 may be an RTP payload header including second sequence number 472 identifying the 16 high order bits of the extended 32-bit RTP packet sequence counter of exemplary video packet 440, length of sample row data (SRD) 474, SRD line number 476 in a range from zero (0) through the maximum line number "N" (0-N) included by the video format of the frame having video packet payload header 470, SRD offset 478, Field Identification bit "F" 480 of video packet 440, and continuation bit "C" 482.

Figure 5:
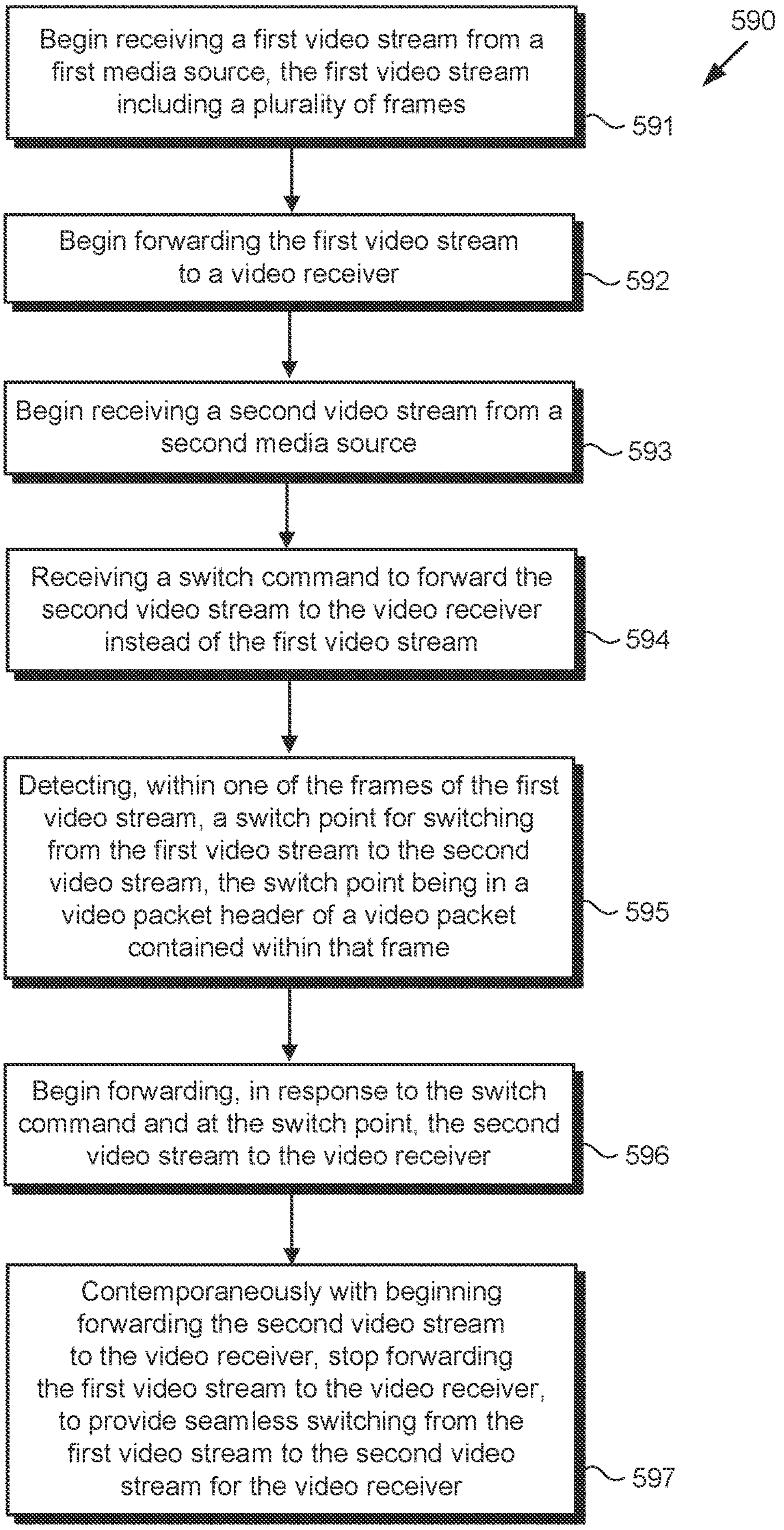
FIG. 5 shows a flowchart presenting an exemplary method for use by a switch to provide seamless video switching, according to one implementation.

The functionality of switch 120/220, in FIGS. 1 and 2, will be further described by reference to FIG. 5, with additional reference to FIGS. 3 and 4. FIG. 5 shows flowchart 590 presenting an exemplary method for use by switch 120/220 to provide seamless video switching, according to one implementation. With respect to the method outlined in FIG. 5, it is noted that certain details and features have been left out of flowchart 590 in order not to obscure the discussion of the inventive features in the present application.

Referring to FIG. 5, with further reference to FIGS. 1, 2, 3, and 4 (hereinafter "FIGS. 1-4") flowchart 590 includes begin receiving, by switch 120/220, first video stream 104/204 from first media source 102*a*/202*a*, first video stream 104/204 including a plurality of frames 330 (action 591). As shown in FIG. 1, in some implementations in which switch 120 and first media source 102*a* are both situated in local media venue 108, first video stream 104 may be received from first media source 102*a*, in action 591, via one of wired or wireless local communication links 114 of local media venue 108. Alternatively, and as shown by FIG. 2, in implementations in which first media source 202*a* is remote from switch 220, first video stream 204 may be received from first media source 202*a*, in action 591, via communication network 210 and network communication links 212. First video stream 104/204 may be received from first media source 102*a*/202*a*, in action 591, by seamless switching software code 126/226 of switch 120/220, executed by processing hardware 122/222.

As noted above, in various implementations, first media source 102*a*/202*a* may be a resource of a media production or broadcast facility, a node of a CDN, or a source of a remote live feed, to name a few examples. As further noted above, first video stream 104/204 may include video in a variety of formats including HD 720p or 1080p video, Quad HD 2K video, or UHD 4K or 8K video in either of progressive format or interlaced format. As also noted above the content carried by first video stream 104/204 and may include content of widely varying types. Examples of the types of content carried by first video stream 104/204 may include audio-video content having audio and video components, or video unaccompanied by audio, as noted above. In addition, or alternatively, in some implementations, the type of content carried by first video stream 104/204 may be or include digital representations of persons, fictional characters, locations, objects, and identifiers such as brands and logos, for example, which populate a VR, AR, or MR environment. Such content may depict virtual worlds that can be experienced by any number of users synchronously and persistently, while providing continuity of data such as personal identity, user history, entitlements, possessions, payments, and the like. In some implementations, the content carried by first video stream 104/204 may be a hybrid of traditional audio-video and fully immersive VR/AR/MR experiences, such as interactive video.

Referring to FIGS. 1, 2, and 5 in combination, flowchart 590 further includes begin forwarding first video stream 104/204 to video receiver 116/216 (action 592). As shown in FIG. 1, in some implementations in which switch 120 and video receiver 116 are both situated in local media venue 108, first video stream 104 may be forwarded to video receiver 116, in action 592, via one of wired or wireless local communication links 114 of local media venue 108. Alternatively, and as shown by FIG. 2, in implementations in which video receiver 216 is remote from switch 220, first video stream 204 may be forwarded to video receiver 216, in action 592, via communication network 210 and network communication links 212. Forwarding of first video stream 104/204 to video receiver 116/216 in action 592 may be performed by seamless switching software code 126/226 of switch 120/220, executed by processing hardware 122/222.

It is noted that although flowchart 590 lists action 592 as following action 591, that representation is provided merely by way of example. In some implementations, switch 120/220 may forward some video packets included in first video stream 104/204 to video receiver 116/216 while receiving other video packets of first video stream 104/204 from first media source 102*a*/202*a*. Thus, in various implementations, action 592 may follow action 591, or may be performed in parallel with, i.e., contemporaneously with action 591.

Continuing to refer to FIGS. 1, 2, and 5 in combination, flowchart 590 further includes begin receiving, by switch 120/220, second video stream 106/206 from second media source 102*b*/202*b* (action 593). Referring further to FIG. 3, it is noted that, like first video stream 104/204, second video stream 106/206 includes a plurality of video frames 330. As described by reference to FIG. 1 but now shown in FIG. 1, in some implementations switch 120 and second media source 102*b* may both be situated in local media venue 108. In those implementations, second video stream 106 may be received from second media source 102*b*, in action 593, via one of wired or wireless local communication links 114 of local media venue 108. Alternatively, and as shown by FIG. 2, in implementations in which second media source 202*b* is remote from switch 220, second video stream 206 may be received from second media source 202*b*, in action 593, via communication network 210 and network communication links 212. Second video stream 106/206 may be received from second media source 102*b*/202*b*, in action 593, by seamless switching software code 126/226 of switch 120/220, executed by processing hardware 122/222.

As noted above, like first media source 102*a*/202*a*, second media source 102*b*/202*b* may be a resource of a media production or broadcast facility, a node of a CDN, or a source of a remote live feed, to name a few examples. As further noted above, like first video stream 104/204, second video stream 106/206 may include video in a variety of formats including HD 720p or 1080p video. Quad HD 2K video, or UHD 4K or 8K video in either of progressive format or interlaced format. As also noted above the content carried by second video stream 106/206 and may include content of widely varying types. Examples of the types of content carried by second video stream 106/206 may include audio-video content having audio and video components, or video unaccompanied by audio, as noted above. In addition, or alternatively, in some implementations, the type of content carried by second video stream 106/206 may be or include digital representations of persons, fictional characters, locations, objects, and identifiers such as brands and logos, for example, which populate a VR, AR, or MR environment. Such content may depict virtual worlds that can be experienced by any number of users synchronously and persistently, while providing continuity of data such as personal identity, user history, entitlements, possessions, payments, and the like. In some implementations, the content carried by second video stream 106/206 may be a hybrid of traditional audio-video and fully immersive VR/AR/MR experiences, such as interactive video.

It is noted that although flowchart 590 lists action 593 as following actions 591 and 592, that representation is provided merely by way of example. In some implementations switch 120/220 may receive second video stream 106/206 from second media source 102*b*/202*b* before forwarding first video stream 104/204 to video receiver 116/216. Moreover, in some implementations, switch 120/220 may forward some video packets included in first video stream 104/204 to video receiver 116/216 while receiving other video packets of first video stream 104/204 from first media source 102*a*/202*a* and also receiving packets of second video stream 106/206 from second media source 102*b*/202*b*. Thus, in various implementations, action 593 may follow actions 591 and 592, may precede action 592, or may be performed in parallel with, i.e., contemporaneously with action 592 or actions 591 and 592.

Continuing to refer to FIGS. 1, 2, and 5 in combination, flowchart 590 further includes receiving switch command 118/218 to forward second video stream 106/206 instead of first video stream 104/204 to video receiver 116/216 (action 594). As shown in FIG. 1, in some implementations in which switch 120 and switch command source 115 are both situated in local media venue 108, switch command 118 may be received from switch command source 115, in action 594, via one of wired or wireless local communication links 114 of local media venue 108. Alternatively, and as shown by FIG. 2, in implementations in which switch command source 215 is remote from switch 220, switch command 218 may be received from switch command source 215, in action 594, via communication network 210 and network communication links 212. Switch command 118/218 may be received, in action 594, by seamless switching software code 126/226 of switch 120/220, executed by processing hardware 122/222.

It is noted that although flowchart 590 lists action 594 as following action 593, that representation is provided merely by way of example. In various implementations, action 594 may precede action 593, may follow action 593, or may be performed in parallel with, i.e., contemporaneously with action 593.

Referring to FIGS. 1-4 in combination with FIG. 5, flowchart 590 further includes detecting, within one of the plurality of frames 330 of first video stream 104/204, switch point 341 for switching from first video stream 104/204 to second video stream 106/206, switch point 341 being in a video packet header of video packet 340/440 contained within that frame 330 (action 595). It is noted that the video packet header of video packet 340/440 in which switch point 341 is detected in action 595 may be either of video packet header 350/450 or video packet payload header 370/470 of video packet 340/440.

In some implementations in which switch point 341 is detected in video packet header 350/450, for example, switch point 341 may be at a predetermined line number, such as a predetermined one of SRD line numbers 476 in video packet header 350/450. In those implementations, for instance, switch point 341 may be at any one of lines zero through the maximum line number "N" (0-N) included by the video format of frame 330. It is noted that, in some use cases, it may be advantageous or desirable for switch point 341 to be within the Vertical Blanking Interval of the video frame, i.e., a period of the video frame in which lines are reserved for vertical retrace on displays. In the case of HDTV 720P format, for example, that interval includes the first twenty-six lines of the frame. Thus, in use cases in which the format of frame 330 is HDTV 720P, it may be advantageous or desirable for switch point 341 to be at one of SRD line numbers 0-25, such as at line nine (9), merely by way of example.

As noted above, in some implementations, video packet 340/440 may be an RTP packet and video packet header 350/450 may be an RTP header. In some of those implementations, switch 120/220 may be programmed or otherwise configured to use RTP marker bit 460 of the RTP packet as switch point 341. Thus, in some implementations in which switch point 341 is detected in video packet header 350/450, switch point 341 may be at RTP marker bit 460 of the RTP packet. Alternatively, in implementations in which switch point 341 is detected in video packet payload header 370/470 in the form of an RTP payload header, for example, switch 120/220 may be programmed or otherwise configured to detect switch point 341 at Field Identification bit 480 of the RTP packet. Detection of switch point 341 in action 595 may be performed by seamless switching software code 126/226 of switch 120/220, executed by processing hardware 122/222.

It is noted that although flowchart 590 lists action 595 as following actions 591, 592, 593, and 594, that representation is provided merely by way of example. In many or most implementations, action 595 may be performed in parallel, i.e., contemporaneously with action 592. Moreover, as noted above, in some implementations, action 593 may be performed in parallel with actions 591 and 592. Thus, in various implementations, action 595 may follow actions 591, 592, 593, and 594, may precede action 594, or may be performed in parallel with, i.e., contemporaneously with actions 592 and 593 or actions 591, 592, and 593.

Referring to FIGS. 1, 2, 3, and 5 in combination, flowchart 590 further includes beginning forwarding, in response to switch command 118/218 and at switch point 341, second video stream 106/206 to video receiver 116/216 (action 596), and contemporaneously with beginning forwarding second video stream 106/206 to video receiver 116/216, stop forwarding first video stream 104/204 to video receiver 116/216, to provide seamless switching from first video stream 104/204 to second video stream 106/206 for video receiver 116/216 (action 597). Actions 596 and 597 may be performed in parallel, i.e., contemporaneously, by seamless switching software code 126/226 of switch 120/220, executed by processing hardware 122/222. By way of example, and further referring to FIG. 4, in use cases in which switch point 341 is at a predetermined line number, such as a predetermined one of SRD line numbers 476 in video packet header 350/450 processing hardware 122/222 may execute seamless switching software code 126/226 to wait while counting those line numbers until the predetermined line number is reached before executing actions 596 and 597.

With respect to execution of actions 596 and 597, in some implementations, when switch 120/220 receives switch command 118/218, switch 120/220 may stop forwarding first video stream 104/204 from first media source 102*a*/202*a* to video receiver 116/216, and begin forwarding second video stream 106/206 from second media source 102*b*/202*b* to video receiver 116/216. It is noted that this approach requires video receiver 116/216 to begin listening for second video stream 104/204 from second media source 102*b*/202*b* synchronously with switch 120/220.

Alternatively, in some implementations switch 120/220 may stop forwarding first video stream 104/204 from first media source 102*a*/202*a* to video receiver 116/216, and begin forwarding second video stream 106/206 from second media source 102*b*/202*b* to video receiver 116/216 while performing Network Address Translation (NAT) by altering the video packets included in second video stream 106/206 so that they retain the same stream identifiers that video receiver 116/216 was already receiving from first media source 102*a*/202*a*, e.g., typically multicast group number and UDP. With respect to the method outlined by flowchart 590, it is emphasized that actions 591, 592, 593, 594, 595, 596, and 597 may be performed as an automated method from which human participation may be omitted.

Thus, as described above, the present application discloses systems and methods providing seamless video switching. As also described above, the switching solution disclosed herein advantageously enables seamless video switching using widely available commercial off-the-shelf (COTS) switching devices, and is suitable for use all video line and frame rates.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A switch comprising:

processing hardware and a memory storing a software code;

the processing hardware of the switch configured to execute the software code of the switch to:

begin receiving a first video stream from a first media source, the first video stream including a plurality of frames, the first video stream being received by the switch: (i) via a first wireless communication link with the first media source, or (ii) via a first network communication link provided by a wide area network (WAN) when the first media source is remote from the switch;

begin forwarding the first video stream to a video receiver physically separate from the switch;

begin receiving a second video stream from a second media source, the second video stream being received by the switch: (i) via a second wireless communication link with the second media source, or (ii) via a second network communication link provided by the WAN when the second media source is remote from the switch;

receive a switch command to forward the second video stream instead of the first video stream to the video receiver;

detect, within one of the plurality of frames of the first video stream, a switch point for switching from the first video stream to the second video stream by inspecting a video packet payload header of a video packet contained within the one of the plurality of frames and counting sample row data (SRD) line numbers in the video packet payload header until a predetermined SRD line number is reached, the switch point being at the predetermined SRD line number;

begin forwarding, in response to the switch command and at the switch point, the second video stream to the video receiver while altering video packet data of the second video stream in real-time; and contemporaneously with beginning forwarding the second video stream to the video receiver, stop forwarding the first video stream to the video receiver, to provide seamless switching from the first video stream to the second video stream for the video receiver.

2. The switch of claim 1, wherein the video packet is a Real-Time Transfer Protocol (RTP) packet.

3. The switch of claim 2, wherein the switch point is at a Field Identification bit of the RTP packet.

4. The switch of claim 3, wherein the predetermined line number is one of line number from zero (0) to twenty-five (25).

5. The switch of claim 1, wherein the switch point is within a blanking interval of the one of the plurality of frames of the first video stream.

6. The switch of claim 1, wherein the switch is a commercial-off-the-shelf (COTS) Internet protocol (IP) switch.

7. A method for use by a switch having processing hardware and a memory storing a software code, the method comprising:

begin receiving, by the software code of the switch executed by the processing hardware of the switch, a first video stream from a first media source, the first video stream including a plurality of frames, the first video stream being received by the switch: (i) via a first wireless communication link with the first media source, or (ii) via a first network communication link provided by a wide area network (WAN) when the first media source is remote from the switch;

begin forwarding, by the software code of the switch executed by the processing hardware of the switch, the first video stream to a video receiver physically separate from the switch;

begin receiving, by the software code of the switch executed by the processing hardware of the switch, a second video stream from a second media source, the second video stream being received by the switch: (i) via a second wireless communication link with the second media source, or (ii) via a second network communication link provided by the WAN when the second media source is remote from the switch;

receiving, by the software code of the switch executed by the processing hardware of the switch, a switch command to forward the second video stream to the video receiver instead of the first video stream;

detecting, by the software code of the switch executed by the processing hardware of the switch within one of the plurality of frames of the first video stream, a switch point for switching from the first video stream to the second video stream by inspecting a video packet payload header of a video packet contained within the one of the plurality of frames and counting sample row data (SRD) line numbers in the video packet payload header until a predetermined SRD line number is reached, the switch point being at the predetermined SRD line number;

begin forwarding, by the software code of the switch executed by the processing hardware of the switch, in response to the switch command and at the switch point, the second video stream to the video receiver while altering video packet data of the second video stream in real-time; and contemporaneously with beginning forwarding the second video stream to the video receiver, stop forwarding, by the software code of the switch executed by the processing hardware of the switch, the first video stream to the video receiver, to provide seamless switching from the first video stream to the second video stream for the video receiver.

8. The method of claim 7, wherein the video packet is a Real-Time Transfer Protocol (RTP) packet.

9. The method of claim 8, wherein the switch point is at a Field Identification bit of the RTP packet.

10. The method of claim 9, wherein the predetermined line number is one of line number from zero (0) to twenty-five (25).

11. The method of claim 7, wherein the switch point is within a blanking interval of the one of the plurality of frames of the first video stream.

12. The method of claim 7, wherein the switch is a commercial-off-the-shelf (COTS) Internet protocol (IP) switch.

13. A computer-readable non-transitory storage medium having stored thereon instructions, which when executed by processing hardware of a switch, instantiate a method comprising:

begin receiving, by the switch, a first video stream from a first media source, the first video stream including a plurality of frames, the first video stream being received by the switch: (i) via a first wireless communication link with the first media source, or (ii) via a first network communication link provided by a wide area network (WAN) when the first media source is remote from the switch;

begin forwarding, by the switch, the first video stream to a video receiver physically separate from the switch;

begin receiving, by the switch, a second video stream from a second media source, the second video stream being received by the switch: (i) via a second wireless communication link with the second media source, or (ii) via a second network communication link provided by the WAN when the second media source is remote from the switch;

receiving, by the switch, a switch command to forward the second video stream to the video receiver instead of the first video stream;

detecting, by the switch within one of the plurality of frames of the first video stream, a switch point for switching from the first video stream to the second video stream, a switch point for switching from the first video stream to the second video stream by inspecting a video packet payload header of a video packet contained within the one of the plurality of frames and counting sample row data (SRD) line numbers in the video packet payload header until a predetermined SRD line number is reached, the switch point being at the predetermined SRD line number;

begin forwarding, by the switch in response to the switch command and at the switch point, the second video stream to the video receiver while altering video packet data of the second video stream in real-time; and contemporaneously with beginning forwarding the second video stream to the video receiver, stop forwarding the first video stream to the video receiver, to provide seamless switching from the first video stream to the second video stream for the video receiver.

14. The computer-readable non-transitory storage medium of claim 13, wherein the video packet is a Real-Time Transfer Protocol (RTP) packet.

15. The computer-readable non-transitory storage medium of claim 14, wherein the switch point is at a Field Identification bit of the RTP packet.

16. The computer-readable non-transitory storage medium of claim 15, wherein the predetermined line number is one of line number from zero (0) to twenty-five (25).

17. The computer-readable non-transitory storage medium of claim 13, wherein the switch point is within a blanking interval of the one of the plurality of frames of the first video stream.

18. The computer-readable non-transitory storage medium of claim 13, wherein the switch is a commercial-off-the-shelf (COTS) Internet protocol (IP) switch.

* * * * *